Patented Apr. 27, 1943

2,317,371

UNITED STATES PATENT OFFICE 2,317,371

COATING AND DECORATING COMPOSITION

Albert E. Gessler, New York, and David M. Gans, Bronx, N. Y., assignors to Interchemical Corporation, New York, N. Y., a corporation of Ohio No Drawing. Application June 6, 1940, Serial No. 339,094

6 Claims. (Cl. 260—22)

This invention relates to coating and decorating compositions, and is particularly directed at the preparation of color-stable, pigmented compositions containing copper phthalocyanine.

Copper phthalocyanine is an exceptionally clean, light fast blue pigment, prepared by reacting phthalonitrile, or some compound yielding phthalonitrile, with copper or a copper compound. Because of its strength, cleanliness of color and light fastness, it has found considerable use in a wide variety of coating and decorating compositions. It has proven particularly useful in the pigment printing of textile fabrics, as a pigment in the new types of printing pastes recently developed comprising water-in-lacquer emulsions, in which the continuous phase is a pigmented water-immiscible lacquer containing a rapidly heat-convertible synthetic resin such as plasticized resins of the urea formaldehyde, heat-convertible phenolic, short-oil alkyd and the like types.

The principal difficulty with copper phthalocyanine in these printing pastes has been its tendency to lose color strength on standing. This tendency is found in other lacquers, and in varnishes, and is, of course, particularly objectionable where the compositions may stand some time before use.

We have discovered that this tendency to lose tinting strength on standing is due to the very slight solubility and consequent recrystallization of the blue pigment in many unsaturated hydrocarbon solvents which must be used, particularly in emulsion printing pastes containing heat-convertible synthetic resins, to dissolve the resins effectively and economically while producing satisfactory emulsions. We have discovered that of all the available volatile solvents, the terpene hydrocarbons alone yield satisfactory emulsifiable lacquers from these resins, which require high solvency solvents.

In general, we have found that the tendency to lose color is particularly marked with aromatic hydrocarbons, and with the so-called "high solvency" aliphatic hydrocarbons which contain high percentages of unsaturated aliphatic hydrocarbons. The tendency to lose color is absent in the saturated aliphatic hydrocarbons, but these compounds have such poor solvency for heat-convertible resins that they cannot be used alone. Esters and alcohols also produce no loss of color; but these widely used lacquer solvents cannot be used without hydrocarbons to economically produce satisfactory stable water-in-lacquer emulsions.

Furthermore, the tendency to lose color is not affected by the presence of other solvents, so that a mixed solvent containing even a small percentage of undesirable constituents causes a marked color loss. Thus, an ordinary mineral spirits, which contains perhaps 5%-6% of unsaturated hydrocarbons (as determined by its solubility in dimethyl sulfate) will produce marked loss of color, while not possessing any marked solvency for the resins. It is necessary, if petroleum hydrocarbons are to be used in our compositions at all, that they be specially refined to a dimethyl sulfate value of below 5.0.

While our invention is particularly applicable to these emulsion printing pastes, advantage can be taken of it in the preparation of ordinary lacquers.

Typical examples of our invention are the following:

EXAMPLE 1

*Emulsion printing paste for textiles*

| | Parts by weight |
|---|---|
| 50% solution of hydrophobe urea type resin in butanol (prepared by reacting urea with formaldehyde, and dehydrating the mixture by refluxing with butanol, in conventional manner) | 10 |
| 50% solution of alkyd resin in turpentine (mixed ester of glycerol, phthalic anhydride and castor oil, corresponding to 35% castor oil, 65% glycerol phthalate) | 30 |
| Pine oil | 8 |
| Turpentine | 24 |
| Water | 23 |
| Sulfonated tannin | 2 |
| Copper phthalocyanine | 3 |

The pigment is added to the lacquer by dispersing in the alkyd resin solution. The emulsion is made by passing the mixture through a colloid mill.

This emulsion is stable against change in the phthalocyanine for all normal storage periods.

EXAMPLE 2

*Emulsion paste*

| | Parts by weight |
|---|---|
| Alkyd resin solution of Example 1 | 40 |
| Pin oil | 8 |
| Turpentine | 19 |
| Water | 28 |
| Sulfonated tannin | 2 |
| Copper phthalocyanine | 3 |

Prepared like Example 1, and as stable.

EXAMPLE 3

*Emulsion paste*

| | Parts by weight |
|---|---|
| 50% solution of hydrophobe urea derivative resin in butanol (prepared like the urea resin of Example 1, but using melamine in place of urea) | 7.5 |
| Alkyd resin solution of Example 1 | 22.5 |
| Pine oil | 10.5 |
| Turpentine | 21.0 |
| Water | 35.0 |
| Dispersing agent | 2.0 |
| Copper phthalocyanine | 1.5 |

The copper phtalocyanine is used as a 20% water pulp, and is mixed with the water and dispersing agent before the water is emulsified into the lacquer.

EXAMPLE 4

*Lacquer*

| | Parts by weight |
|---|---|
| ½″ R. S. nitrocellulose (containing 30% alcohol) | 8.0 |
| Glycerol rosin ester gum | 8.0 |
| Tricresyl phosphate | 4.0 |
| $TiO_2$ | 6.0 |
| Copper phthalocyanine | 1.0 |
| Ethyl acetate | 14.5 |
| Butyl acetate | 14.5 |
| Denatured alcohol | 3.7 |
| Butanol | 3.8 |
| Petroleum distillate (boiling range—96° C.–129° C.—dimethyl sulfate 2.0) | 36.5 |

The pigment is dispersed in the tricresyl phosphate in any desired manner, or is ground in a pebble mill with a solution of the ester gum in the petroleum distillate. The lacquer is stable against color change; with toluene replacing the petroleum distillate, the blue tint is almost entirely gone in less than a week.

While we have shown but a few examples of my invention, it is obvious that a wide variety of other materials may be used to replace the particular materials shown. In general, all of the common water insoluble film-forming materials may be used, including cellulose esters and ethers, natural and synthetic resins, fatty oils, natural and synthetic rubbers, and the like. Heat convertible resins which do not dissolve in petroleum hydrocarbons, and which are essential for the production of desirable textile printing compositions, include heat convertible phenol-aldehyde resins, alkyd resins modified with small quantities (below about 40%) of fatty oil, resins of the urea-formaldehyde type (including thiourea and urea derivatives such as biuret, guanidine, melamine, etc.), other amine aldehyde resins and the like. Any pigments may be blended with the copper phthalocyanine.

The important point is the freedom of the composition from unsaturated aliphatic and from aromatic hydrocarbons, which is defined in the claims.

We claim:

1. A composition comprising copper phthalocyanine dispersed in a liquid comprising a heat-convertible synthetic resin soluble in aromatic hydrocarbons and insoluble in saturated aliphatic hydrocarbons, dissolved in a volatile liquid pine terpene, the composition being substantially free of aromatic hydrocarbons and of unsaturated aliphatic hydrocarbons.

2. The composition of claim 1, in which the resin is a urea formaldehyde type resin in the solvent soluble stage.

3. The composition of claim 1, in which the resin is an oil-modified alkyd resin.

4. A composition comprising an emulsion of water in a water-immiscible composition comprising copper phthalocyanine, dispersed in a liquid comprising a heat-convertible synthetic resin soluble in aromatic hydrocarbons and insoluble in saturated aliphatic hydrocarbons dissolved in a liquid volatile pine terpene, the composition being substantially free of aromatic hydrocarbons and of unsaturated aliphatic hydrocarbons.

5. The composition of claim 4, in which the resin is a urea formaldehyde type resin in the solvent soluble stage.

6. The composition of claim 4, in which the resin is an oil-modified alkyd resin.

ALBERT E. GESSLER
DAVID M. GANS.